United States Patent Office 3,313,754
Patented Apr. 11, 1967

3,313,754
ALLOYS OF POLYOLEFINS AND ROSIN
DERIVATIVES
Lawrence J. Logan, Wilmington, Del., assignor to Hercules Incorporated, a corporation of Delaware
No Drawing. Filed Dec. 16, 1964, Ser. No. 418,915
12 Claims. (Cl. 260—27)

This invention relates to alloys or blends of polyolefins and certain rosin derivatives, as hereinafter described, and to free self-supporting films produced from such alloys or blends.

Highly crystalline, high molecular weight polymers of ethylene, propylene, and higher α-olefins are relatively new synthetic polymers that are finding wide acceptance in the plastics art. One of the most promising uses for these new polymers is in the manufacture of film which in turn finds use in the packaging and related arts. In order for these films to enjoy widespread use, however, it is desirable that the film be stable upon exposure to sunlight and be easily heat-sealed at a temperature which does not destroy the orientation of the film and cause film shrinkage.

Numerous solutions to the problem of light stability have been proposed. These proposed solutions, for the most part, involve the addition of small amounts of metal salts or ultraviolet screening agents to the polymer. While films of polymers containing these additives do possess improved light stability, they cannot be heat-sealed any more easily than films which do not contain such additives.

One approach which has been made to solve the heat-sealing difficulties of oriented film of these polyolefins is to provide the film with a coating of material that is more heat sensitive and hence heat sealable at a lower temperature than the film itself. This approach has met with difficulties because polyethylene and stereoregular polyolefins are unreceptive to the majority of lacquers and similar materials that are normally used as heat-sealable coatings on other films such as films of regenerated cellulose.

While considerable progress has been made in improvin the adhesion of heat-sealable coatings to these films, such methods are both expensive and cumbersome. There is a real need, therefore, for means whereby polyethylene and stereoregular polyolefin film can be made heat sealable without resorting to a separate coating operation.

Additionally, for certain uses it is desirable that the films have a relatively high modulus. The modulus is important from the standpoint of machinability in mechanized packaging.

Alloys, i.e., blends, of polypropylene and a polyterpene have been proposed as coatings for paper, and the coatings are described as heat sealable. However, such alloys have very poor stability to light and heat.

In accordance with this invention, it has been found that new and very useful alloys can be prepared from polyethylene and the stereoregular polymers of propylene and higher α-olefins which have been mixed with from about 1% to about 60% by weight, based on alloy weight, of certain rosin derivatives which have a drop softening point above about 70° C. and which are compatible with the polyolefin, said rosin derivatives being selected from the group consisting of (1) modified rosins of the group consisting of hydrogenated rosin, disproportionated rosin, polymerized rosin, condensation adducts of rosin and unsaturated, carbocyclic compounds, hydrogenated disproportionated rosin, hydrogenated polymerized rosin, and hydrogenated condensation adducts of rosin and unsaturated carbocyclic compounds; (2) resin acids of the group consisting of dihydroabietic acid, tetrahydroabietic acid, dehydroabietic acid, dihydrodextropimaric acid, tetrahydrodextropimaric acid, dihydroisodextropimaric acid, tetrahydroisodextropimaric acid, and mixtures thereof (3) esters of the group consisting of esters of the modified rosins as defined in (1) above and alcohol derived by hydrogenolysis of methyl esters of rosin acids, and esters of the resin acids as defined in (2) above and alcohol derived by hydrogenolysis of methyl esters of rosin acids; (4) di-rosin amine; (5) monoamides of the general formula

in which X is a radical of the group consisting of dihydroabietyl, tetrahydroabietyl, dehydroabietyl, dihydrodextropimaryl, tetrahydrodextropimaryl, dihydroisodextropimaryl, and tetrahydroisodextropimaryl radicals, and Y is a radical of the group consisting of dihydroabietate, tetrahydroabietate, dehydroabietate, dihydrodextropimarate, tetrahydrodextropimarate, dihydroisodextropimarate, and tetrahydroisodextropimarate radicals; and (6) diamides of the general formula

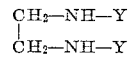

in which each Y is a radical as defined in (5) above. These alloys can be formed into films, foils, sheets, ribbons, fibers, and other film-like and filamentary structures possessing outstanding physical properties and good heat sealability.

The mixtures of polyolefins and the rosin derivatives of this invention are termed "alloys" since they are physical mixtures or blends of the rosin derivatives distributed substantially uniformly through the body of the polyolefin.

The alloys of this invention are readily prepared by conventional methods of mixing and blending employed in the plastics art. For example, stereoregular polypropylene flake or molding powder granules and particles or granules of the rosin derivative may be preliminarily mixed together in a tumbling barrel, or in a Sweetie barrel, or in a ribbon mixer, or the like, and the resulting mixture then intimately blended by malaxating on a hot two-roll mill or in a Banbury mixer, or in the barrel of a heated extruding apparatus to prepare the desired alloy which may then be directly extruded into film, or reduced to suitable molding powder granules by conventional comminuting methods for charging to an extrusion apparatus.

Although any polymer of a mono-α-olefin having at least 2 carbon atoms can be employed in this invention, the invention is particularly useful with polyethylene and stereoregular (sometimes called isotactic) polymers of mono-α-olefins having from 3 to 6 carbon atoms, including, for instance, polypropylene, poly(butene-1), poly-(pentene-1), poly(3-methyl-butene-1), and poly(4-methyl-pentene-1). The polymer can, and normally will, contain ingredients other than those specified in this invention. Such other ingredients include, by way of example, antacids, such as calcium stearate, antioxidants, and heat stabilizers such as alkylated phenols, alkylidene bis(alkylphenols), terpene phenols, polyhydroxychromans and alkyl esters of thiodipropionic acid, and light stabilizers such as benzophenone derivatives, and alkyl and aralkyl esters of salicyclic acid, nickel phenolates, and the like.

The rosin derivatives employed in this invention are amorphous, hard, brittle, solid resins at room temperature, having a softening range at elevated temperature, a drop softening point above about 70° C., and are compatible with the polyolefin.

The rosin derivatives suitable for the purposes of this invention may be prepared from gum rosin, wood rosin, or tall oil rosin, all of which are commercially available. The rosin derivatives of this invention are for the most part known materials, which have been adequately described in the technical and patent literature. Many are commercial products. For a clear understanding of the nature and chemistry of rosin and rosin derivatives, there is an excellent technical description in the Encyclopedia of Chemical Technology, volume 11, pages 779–810, copyright 1953 by The Interscience Encyclopedia, Inc., entitled, "Rosin and Rosin Derivatives," by George C. Harris. The contents of this encyclopedic reference, together with the patent and technical literature references cited therein, are hereby incorporated hereinto by reference.

As pointed out hereinabove, it will be seen that the rosin derivatives which are suitable for the purposes of this invention can be grouped into 6 classes, as follows:

The first of these classes comprises rosins which have been modified by hydrogenation, disproportionation, polymerization, condensation with unsaturated carbocyclic compounds to form resinous condensation adducts, or combinations of such modifying treatments. Some typical representative members of this class include hydrogenated rosin, disproportionated rosin, polymerized rosin, specifically dimerized rosin, hydrogenated disproportionated rosin, hydrogenated dimerized rosin, condensation adduct of rosin and styrene, hydrogenated condensation adduct of rosin and styrene, condensation adduct of rosin and divinyl benzene, hydrogenated condensation adduct of rosin and divinyl benzene, condensation adduct of rosin and diisopropenyl benzene, condensation adduct of rosin and α-methyl-para-methyl styrene, condensation adduct of rosin and cyclopentadiene, hydrogenated condensation adduct of rosin and cyclopentadiene, and the like. Suitable methods for hydrogenating, disproportionating, and polymerizing rosin are disclosed in the encyclopedic article by George C. Harris cited hereinabove and the patent and technical literature references cited therein. The condensation products of rosin with unsaturated carbocyclic compounds may be prepared by the method described in U.S. Patent 2,532,120 to Alfred L. Rummelsburg, and these condensation products can be hydrogenated by the same methods used to hydrogenate rosin.

Hydrogenated rosin for the purposes of this invention may be partially hydrogenated rosin which has been hydrogenated to the so-called "dihydro" stage, where one of the two ethylenic unsaturated linkages in the naturally occurring abietic-type and pimaric-type resin acids present in rosin has been substantially saturated with hydrogen, or fully hydrogenated rosin which has been hydrogenated to the so-called "tetrahydro" stage, where both of the two ethylenic unsaturated linkages in the naturally occurring abietic-type and pimaric-type resin acids present in rosin have been substantially saturated with hydrogen. The term "hydrogenated rosin," therefore, is used to denote any hydrogenated rosin in which at least one of the two ethylenic unsaturated linkages in the naturally occurring abietic-type and pimaric-type resin acids present in rosin has been substantially saturated with hydrogen.

The second of these classes comprises the individual resin acids which are the resin acid components of the hydrogenated rosin and disproportionated rosin of the first class. The principal members of this class include dihydroabietic acid, tetrahydroabietic acid, dehydroabietic acid, dihydrodextropimaric acid, tetrahydrodextropimaric acid, dihydroisodextropimaric acid, and tetrahydroisodextropimaric acid. These individual resin acids may be isolated by the amine salt method described in the article entitled "An Improved Method for Isolation of Resin Acids; The Isolation of a New Abietic-Type Acid, Neoabietic Acid," by George C. Harris and Thomas F. Sanderson, "J. Am. Chem. Soc.," 70, 334 (1948). These individual resin acids may be mixed together in any desired combination, and this invention contemplates the use not only of the individual resin acids per se, but also mixtures of the individual resin acids in any desired combination.

The third of these classes comprises the hydroabietyl alcohol esters of the modified rosins of class (1) above and the resin acids of class (2) above. Some typical representative members of this class include the hydroabietyl alcohol ester of hydrogenated rosin, the hydroabietyl alcohol ester of disproportionated rosin, the hydroabietyl alcohol ester of dihydroabietic acid, the hydroabietyl alcohol ester of tetrahydroabietic acid, the hydroabietyl alcohol ester of dehydroabietic acid, and the like. Hydroabietyl alcohol may be prepared by the hydrogenolysis of the methyl ester of rosin at 300° C. and 5000 p.s.i. in the presence of copper chromite catalyst in accordance with the process described in U.S. Patents 2,358,234 and 2,358,235 to W. A. Lazier. Conventional methods of esterification may be employed to prepare the esters, keeping in mind that the structurally hindered nature of the resin acid carboxyl group makes it necessary to use higher temperatures, on the order of 250°–300° C., and that means to remove water formed by the esterification reaction should be provided.

Di-rosin amine which constitutes the fourth class of rosin derivatives suitable for the purposes of this invention may be prepared by the hydrogenation of rosin nitrile over a nickel catalyst at temperatures above about 200° C. with removal of ammonia. It may also be prepared from rosin amine by heating in the presence of a nickel catalyst, removing ammonia as it is formed.

The monoamides which constitute the fifth class of rosin derivatives suitable for the purposes of this invention may be prepared by reacting a modified rosin of class (1) above or a resin acid of class (2) above with an amine derived by the ammonolysis of a modified rosin of class (1) above or a resin acid of class (2) above. Some typical representative members of this class include N-dehydroabietyl hydrogenated rosin amide, N-dihydroabietyl hydrogenated rosin amide, N-tetrahydroabietyl hydrogenated rosin amide, N-dehydroabietyl disproportionated rosin amide, N-dihydrodextropimaryl dimerized rosin amide, N-dehydroabietyl dihydroabietic acid amide, N-dihydroabietyl dehydroabietic acid amide, N-tetrahydroabietyl tetrahydroabietic acid amide, and the like.

The diamides which constitute the sixth class of rosin derivatives suitable for this invention may be prepared by reacting ethylene diamine with a modified rosin of class (1) above or a resin acid of class (2) above at high temperatures in the range of 250°–300° C. under high vacuum to remove volatile by-products by "topping." Some typical representative members of this class include the diamide of hydrogenated rosin and ethylene diamine, the diamide of disproportionated rosin and ethylene diamine, the diamide of dehydroabietic acid and ethylene diamine, the diamide of tetrahydroabietic acid and ethylene diamine, and the like.

The amount of rosin derivative that is alloyed with the polyolefin is between about 1% and about 60% by weight of the alloy, preferably between about 5% and about 40% by weight of the alloy. An amount below about 1% by weight of rosin derivative is generally insufficient to appreciably enhance the heat-sealability of film produced from the alloy. Above about 60% by weight of rosin derivative leads to brittle films having poor strength.

Formation of the alloys of this invention into self-supporting films and fibers can be readily accomplished by any of the conventional extrusion, casting, or molding procedures well known in the plastics and film art. For example, films of the alloy may be formed by applying a solution of the alloy in a solvent, as, for example, n-decane, to a hard surface such as glass, metal, etc., evaporating the solvent, and then stripping the film from the substrate. Films of these alloys may be formed without the use of a solvent by spreading the molten alloy on a hard dense surface such as the smooth polished surface of a metal casting roll or drum or belt and, after cooling, stripping of the film, or the molten alloy may be extruded directly as a flat sheet, or it may be extruded into a tube, blown, and then cut and flattened. Another method of forming films which may be applied to these alloys is to pass the alloy through a pair of rolls, one of which is at a temperature above the softening temperature of the alloy and the other is cold, and then cutting the sheet so formed from the roll.

These films may be used in an unoriented state, or they may be uniaxially or biaxially oriented in the plane of the film whereby higher tensile and impact strengths are obtained. For example, when extruded directly as a flat sheet, quenched, and then drawn in one direction below the crystalline melting point of the alloy, the drawing will bring about molecular orientation in the direction of the draw. Likewise, a biaxially oriented sheet, i.e., a sheet drawn both in the machine direction and in the cross machine direction in the plane of the sheet, may be easily produced by drawing the sheet lengthwise and crosswise simultaneously, or by stretching or drawing a previously drawn sheet in the plane of the film perpendicular to that of the prior draw. This latter method of sequentially drawing the film is of particular importance when using the alloys of the present invention since the rosin derivatives appear to impart certain processability advantages to the alloys which permit the production of a balanced, biaxially oriented film using a 2-step draw, a result which could only be obtained by a 3-step process with nonalloyed film. In the same way, if the alloy is extruded into a tube and then blown below the melting point of the alloy, the latter action will bring about the molecular orientation of the film. If the film is formed by solvent-casting or by spreading the molten alloy on a hard surface, molecular orientation may readily be obtained by elongation of the film. The strength and toughness of melt-cast or melt-extruded films may also be improved by rapid cooling as by means of an air or liquid stream.

As has already been pointed out, overlap heat-sealable, self-supporting, oriented films can be formed from the alloys of the polyolefin and rosin derivatives of this invention. This, of course, is an outstanding advantage of these films over oriented films of nonalloyed polyolefins since there is little porblem of loss of orientation or shrinkage of film during heat-sealing, which is of prime importance in film used for packaging. Another very outstanding advantage of the alloy films of this invention is the ability to heat-seal at lower temperatures over a wider temperature range than nonalloyed film. Another advantage includes the considerably higher modulus (tensile) as compared with oriented films of nonalloyed polyolefins. The increase in tensile modulus (stiffness) is an important factor in packaging and results in an improvement in machinability. Other advantages as compared with oriented films of nonalloyed polyolefins include higher shrinkage at a given temperature, lower gas permeability, lower moisture vapor transmission, and better crease retention.

The general nature of the invention has been set forth, and the following examples illustrate some specific embodiments thereof. It is to be understood, however, that the invention is not limited to the examples, since the invention may be practiced by the use of various modifications and changes within the scope of the invention as herein described. In the examples, the physical properties of the films were measured in accordance with the following ASTM test procedures:

Tensile strength  
Elongation —— D882–61T, 1,000% elongation/minute.  
Tensile modulus Overlap heat seal strength—D903–49.  
Gardner haze—D1003–59.

The compatibility of the rosin derivative with the polyolefin can be determined by any of the methods described by Nielsen, Mechanical Properties of Polymers, chapter 7, pp. 138 and 172, Reinhold Publishing Corp., New York (1962). In the following examples, compatibility in all alloys was determined by visual examination of biaxially oriented alloy films approximately 0.7-mil thick. Clear films substantially free of visible haze denoted good compatibility of the rosin derivative with the polyolefin. In some of the examples compatibility was also measured by the Gardner Haze method noted above or unoriented 5-mil films of the alloy which had been prepared from molding powder granules of the alloy by pressing at 232° C. under 850 p.s.i. pressure and then quenching the film. Haze values of less than 25% denote good compatibilty of the rosin derivative with the polyolefin. Specimens for the overlap heat seal strength were prepared by sealing two one-inch wide strips of alloy film together on the Sentinel hot bar heat-sealer (model 12–12 ASC), using a dwell time of two seconds, a bar pressure of 20 p.s.i., and a bar temperature of 275° F. The heat seal values shown are an average of values obtained on four replicate specimens of each alloy. Light stability was evaluated on 0.5-inch strips of 0.7-mil biaxially oriented films of the alloys mounted on white cardboard by exposing the mounted films in a Xenon arc tester ("Weatherometer," Atlas Electric Devices Co., model 60–W), and periodically examining the strips and noting the exposure time elapsed until the strips became brittle, the embrittlement point being the exposure time (in days) elapsed until the strips broke when bent double. Reduced specific viscosity is the specific viscosity, $\eta_{sp}$, divided by concentration, C., as measured on a 0.1 gram solution of polyolefin in 100 ml. of decahydronaphthalene at 135° C. The softening point of the rosin derivative is that temperature (°C.) at which the derivative changes from a rigid to a soft state, as determined by the Hercules drop method (described in technical pamphlet No. 400–341–C., entitled, "The Hercules Drop Method for Determining the Softening Point of Rosins and Modified Rosins," Hercules Powder Company, Wilmington, Del.). All parts and percentages are by weight unless otherwise specified.

*Example 1*

Eighty (80) parts of pulverulent stereoregular polypropylene having a birefringent melting point of 167° C. and a reduced specific viscosity of 3.0 and containing 0.25% of dilaurylthiodipropionate, 0.1% of the condensation product of 1 mole of crotonaldehyde and 3 moles of 3-methyl-6-tert-butyl-phenol, and 0.1% of calcium stearate as stabilizers was dry blended in a high shear dry blendor for 1 minute with 20 parts of the N-dehydroabietyl amide of partially hydrogenated rosin (hydrogenated to the "dihydro" stage) which was ground to pass a 20-mesh sieve, and which had a drop softening point of 95° C. This dry blend was then melt extruded at 232° C. into strands which were chilled and chopped into uniform molding powder granules. This molding powder was then converted into film 12 mils thick by compression molding the granules into sheets at 232° C. and 850 p.s.i. pressure and then cooled rapidly by queching. The pressed sheets were converted into biaxially oriented film 0.7-mil thick by stretching the sheets 4 times in both directions simultaneously at 150° F. The oritented films were observed to be sparkling clear and free of haze, thus denoting good compatibility of the rosin derivative with the polypropylene in the resulting alloy films. Properties of the alloy films are recorded in the following table.

Gardner haze, on 5-mil unoriented film, percent _____ 7.4  
Tensile strength, p.s.i. _____ 15,000  
Elongation, percent _____ 85  
Tensile modulus, p.s.i. _____ 310,000  
Overlap heat seal strength, lbs./in. _____ 0.59  
Embrittlement time, days, xenon arc _____ 1.9

Example 2

With the exception that a temperature of 250° F. was employed to biaxially orient the alloy films, the same procedure described in Example 1 was followed to alloy 80 parts of the same pulverulent stereoregular polypropylene employed in Example 1, containing the same stabilizers in the same amounts, with 20 parts of substantially fully hydrogenated dimerized rosin (hydrogenated to the "tetrahydro" stage) which had a drop softening point of 153° C. The resulting oriented alloy films were observed to be clear and substantially free of haze. Properties of the alloy films are recorded in the following table.

Gardner haze, on 5-mil unoriented film, percent _ 13
Tensile strength, p.s.i. _____ 22,000
Elongation, percent _____ 100
Tensile modulus, p.s.i. _____ 370,000
Overlap heat seal strength, lbs./in. _____ 0.39
Embrittlement time, days, xenon arc _____ 7

Example 3

The same procedure described in Example 2 was followed to alloy 80 parts of the same pulverulent stereoregular polypropylene, containing the same stabilizers in the same amounts as described in Example 1, with 20 parts of the substantially fully hydrogenated adduct of rosin and styrene (hydrogenated to the "tetrahydro" stage). The resulting oriented alloy films were observed to be sparkling clear and free of haze. Properties of the alloy films are recorded in the following table.

Gardner haze, on 5-mil unoriented film, percent _ 12
Tensile strength, p.s.i. _____ 21,000
Elongation, percent _____ 125
Tensile modulus, p.s.i. _____ 340,000
Overlap heat seal strength, lbs./in. _____ 0.42
Embrittlement time, days, xenon arc _____ 8.8

Example 4

With the exception that a temperature of 200° F. was employed to biaxially orient the alloy films, the same procedure described in Example 1 was followed to alloy 80 parts of the same pulverulent stereoregular polypropylene, containing the same stabilizers in the same amounts as described in Example 1, with 20 parts of substantially fully hydrogenated rosin (hydrogenated to the "tetrahydro" stage) having a drop softening point of 92° C. The resulting oriented alloy films were observed to be clear and free of haze. Properties of the alloy films are recorded in the following table.

Tensile strength, p.s.i. _____ 19,000
Elongation, percent _____ 136
Tensile modulus, p.s.i. _____ 330,000
Embrittlement time, days, xenon arc _____ 8.1

Example 5

The same procedure described in Example 2 was followed to alloy 80 parts of the same pulverulent stereoregular polypropylene, containing the same stabilizers in the same amounts, as described in Example 1, with 20 parts of dehydroabietic acid. The resulting oriented alloy films were observed to be clear and free of haze. Properties of the alloy films are recorded in the following table.

Tensile strength, p.s.i. _____ 19,000
Elongation, percent _____ 90
Tensile modulus, p.s.i. _____ 340,000
Embrittlement time, days, xenon arc _____ 5.6

Example 6

The same procedure described in Example 2 was followed to alloy 80 parts of the same pulverulent stereoregular polypropylene, containing the same stabilizers in the same amounts, as described in Example 1, with 20 parts of the hydroabietyl alcohol ester of partially hydrogenated rosin (hydrogenated to the "dihydro" stage) and having a drop softening point of 71° C. The resulting oriented alloy films were observed to be clear and free of haze. Properties of the alloy films are recorded in the following table.

Gardner haze, on 5-mil unoriented film, percent   9.8
Tensile strength, p.s.i. _____ 20,000
Elongation, percent _____ 80
Tensile modulus, p.s.i. _____ 232,000

Example 7

The same procedure described in Example 2 was followed to alloy 80 parts of the same pulverulent stereoregular polypropylene, containing the same stabilizers in the same amounts, as described in Example 1, with 20 parts of the diamide of substantially fully hydrogenated rosin (hydrogenated to the "tetrahydro" stage) and ethylene diamine. The resulting oriented alloy films were observed to be sparkling clear and free of haze. Properties of the alloy films are recorded in the following table.

Tensile strength, p.s.i. _____ 21,000
Elongation, percent _____ 97
Tensile modulus, p.s.i. _____ 340,000

The oriented alloy films of this example formed strong overlap heat seals, but no numerical value was obtained for the strength of the heat seal.

Example 8

The same procedure described in Example 2 was followed to alloy 80 parts of the same pulverulent stereoregular polypyropylene, containing the same stabilizers in the same amounts, as described in Example 1, with 20 parts of dirosin amine. The resulting oriented alloy films were observed to be sparkling clear and free of haze. Properties of the alloy films are recorded in the following table.

Tensile strength, p.s.i. _____ 20,300
Elongation, percent _____ 95
Tensile modulus, p.s.i. _____ 280,000

The oriented alloy films of this example formed strong overlap heat seals, but no numerical value was obtained for the strength of the heat seal.

What I claim and desire to protect by Letters Patent is:

1. An alloy consisting essentially of (A) a polyolefin selected from the group consisting of crystalline polyethylene and stereoregular homopolymers of α-olefins containing at least 3 carbon atoms and (B) from about 1% to about 60% by weight of said alloy of rosin derivative compatible with said polyolefin and having a drop softening point above about 70° C., said rosin derivative being selected from the group consisting of (1) modified rosins of the group consisting of hydrogenated rosin, disproportionated rosin, polymerized rosin, condensation adducts of rosin and unsaturated carbocyclic hydrocarbons, hydrogenated disproportionated rosin, hydrogenated polymerized rosin, and hydrogenated condensation adducts of rosin and unsaturated carbocyclic hydrocarbons; (2) resin acids of the group consisting of dihydroabietic acid, tetrahydroabietic acid, dehydroabietic acid, dihydrodextropimaric acid, tetrahydrodextropimaric acid, dihydroisodextropimaric acid, tetrahydroisodextropimaric acid, and mixtures thereof; (3) esters of the group consisting of esters of the modified rosins as defined in (1) above and hydroabietyl alcohol, and esters of the resin acids as defined in (2) above and hydroabietyl alcohol; (4) di-rosin amine; (5) monoamides of the general formula

in which X is a radical of the group consisting of dihydroabietyl, tetrahydroabietyl, dehydroabietyl, dihydrodextropimaryl, tetrahydrodextropimaryl, dihydroisodextropimaryl and tetrahydroisodextropimaryl radicals, and Y is a radical of the group consisting of dihydroabietate, tetrahydroabietate, dehydroabietate, dihydrodextropimarate, tetrahydrodextropimarate, dihydroisodextropimarate, and tetrahydroisodextropimarate radicals; and (6) diamides of the general formula

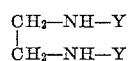

in which each Y is a radical as defined in (5) above.

2. An unsupported film of the alloy of claim 1.
3. A biaxially oriented film of the alloy of claim 1.
4. An alloy according to claim 1 in which the rosin derivative is substantially fully hydrogenated rosin in which both of the two ethylenically unsaturated linkages in the naturally occuring abietic-type and pimaric-type resin acids present in rosin have substantially saturated with hydrogen.
5. An alloy according to claim 1 in which the rosin derivative is hydrogenated dimerized rosin.
6. An alloy according to claim 1 in which the rosin derivative is the hydrogenated condensation adduct of rosin and styrene.
7. An alloy according to claim 1 in which the rosin derivative is dehydroabietic acid.
8. An alloy according to claim 1 in which the rosin derivative is the N-dehydroabietyl amide of hydrogenated rosin in which one of the two ethylenically unsaturated linkages in the naturally occuring abietic-type and pimaric-type resin acids present in rosin has been substantially saturated with hydrogen.
9. An alloy according to claim 1 in which the resin derivative is the hydroabietyl alcohol ester of hydrogenated rosin in which one of the two ethylenically unsaturated linkages in the naturally occurring abietic-type and pimaric-type resin acids present in rosin has been substantially saturated with hydrogen.
10. An alloy according to claim 1 in which the rosin derivative is the diamide of ethylene diamine and substantially fully hydrogenated rosin.
11. An alloy according to claim 1 in which the rosin derivative is dirosin amine.
12. An alloy according to claim 1 in which the polyolefin is steroregular polypropylene.

References Cited by the Examiner
UNITED STATES PATENTS

| | | | |
|---|---|---|---|
| 2,519,755 | 8/1950 | Gribbins | 260—45.85 |
| 2,551,087 | 5/1951 | Barnhart et al. | 260—27 |
| 2,729,608 | 1/1956 | Strain | 260—27 |
| 2,952,867 | 9/1960 | Diedrich et al. | 18—1 |
| 3,141,912 | 7/1964 | Goldman et al. | 264—95 |
| 3,181,971 | 5/1965 | Rayner | 260—45.9 |
| 3,220,966 | 11/1965 | Flanagan | 260—27 |
| 3,243,396 | 3/1966 | Hammer | 260—28.5 |

FOREIGN PATENTS

| | | |
|---|---|---|
| 115,542 | 11/1958 | Russia. |
| 282,841 | 9/1952 | Switzerland. |
| 523,33 | 10/1953 | Belgium. |

OTHER REFERENCES

Harris: Encyclopedia of Chemical Technology, December 1953, page 788 made of record.
Adhesives Age, May 1960, pages 31–34 relied on.

DONALD E. CZAJA, *Primary Examiner.*
LEON J. BERCOVITZ, *Examiner.*
F. McKELVEY, *Assistant Examiner.*